Aug. 25, 1936.  E. SEIBOLD  2,052,492
ROTARY ENGINE
Filed Aug. 17, 1931   4 Sheets-Sheet 1
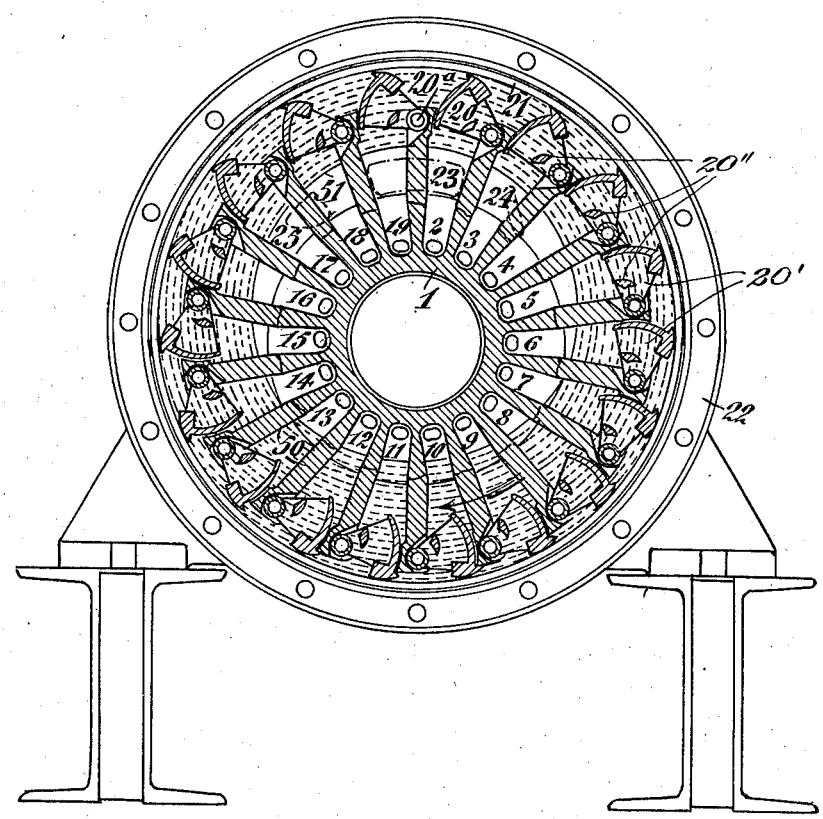
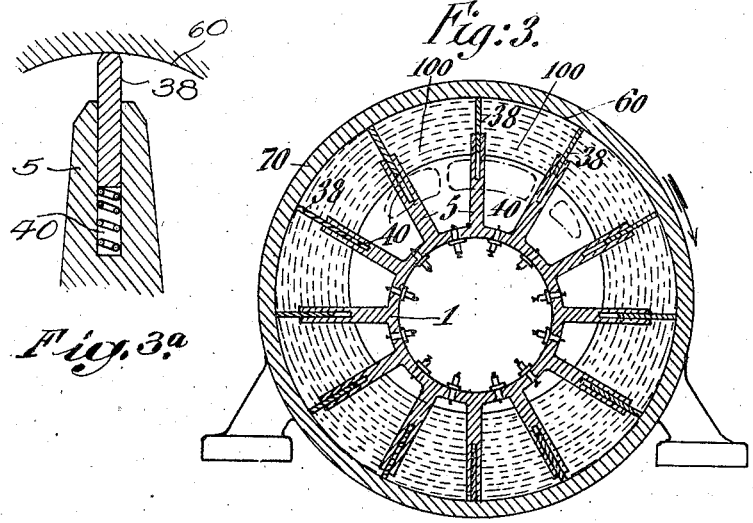
INVENTOR
Ernst Seibold
BY C. P. Goepel
his ATTORNEY.

Aug. 25, 1936.　　　　　E. SEIBOLD　　　　　2,052,492
ROTARY ENGINE
Filed Aug. 17, 1931　　　　4 Sheets-Sheet 3
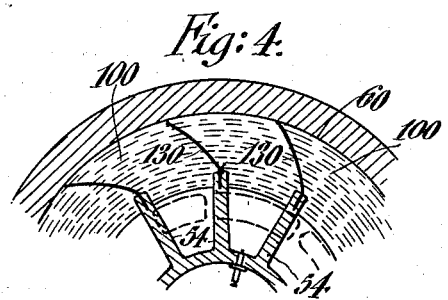
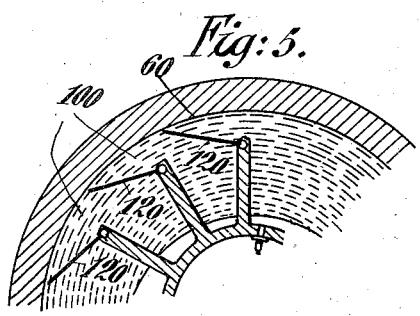
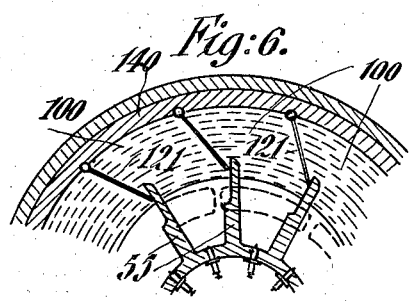
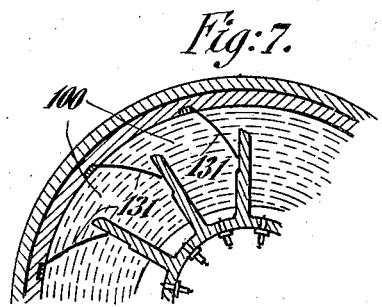
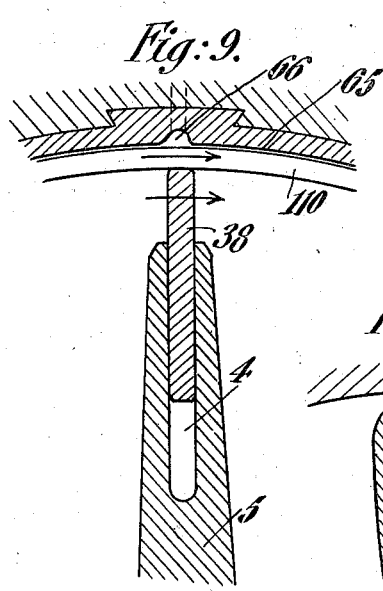
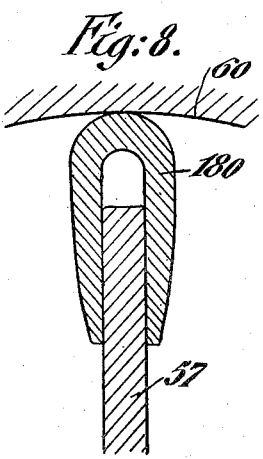
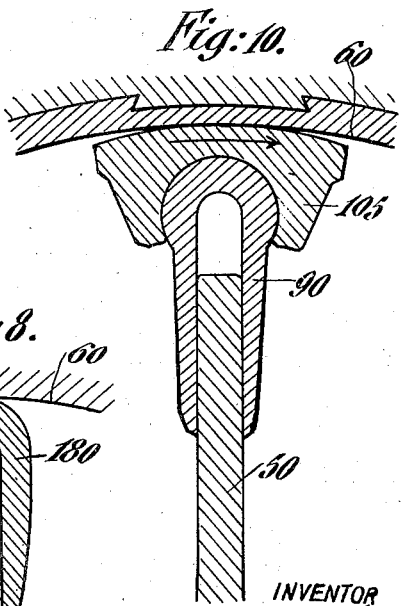
INVENTOR
Ernst Seibold
BY his ATTORNEY.

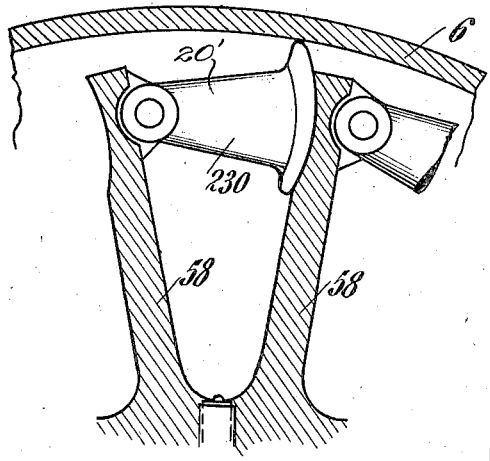
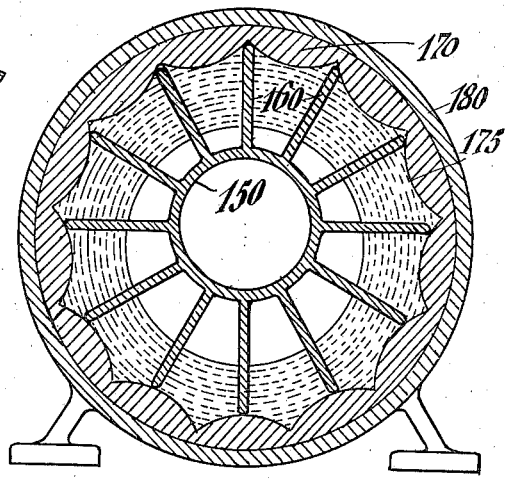
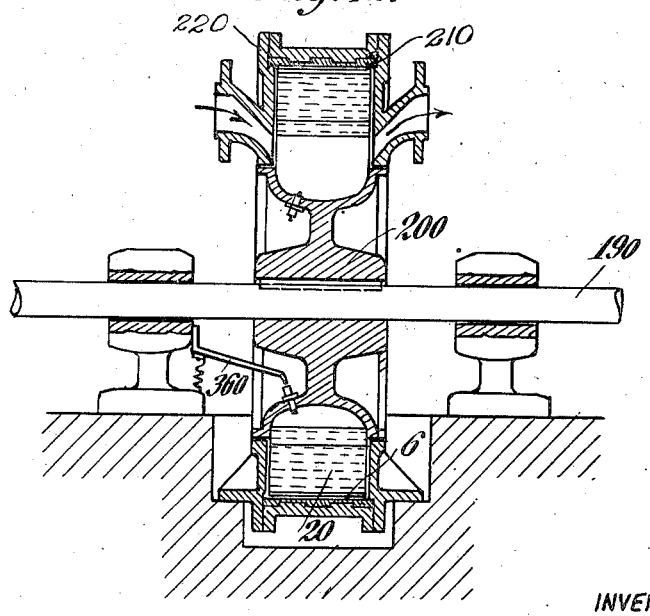

Patented Aug. 25, 1936

2,052,492

UNITED STATES PATENT OFFICE 2,052,492

ROTARY ENGINE

Ernst Seibold, Heidenheim-on-the-Brenz, Wurttemberg, Germany, assignor to J. M. Voith, Heidenheim-on-the-Brenz, Germany, a copartnership composed of Walther Voith, Hermann Voith, and Hanns Voith Application August 17, 1931, Serial No. 557,529
In Germany August 16, 1930

15 Claims. (Cl. 123—8)

(Granted under section 14, act of March 2, 1927, 357 O. G. 5)

This invention relates to rotary engines, and more particularly to engines of that general type in which the driving impulse is imparted to the rotor through the medium of a combustible gas acting upon liquid within the combustion chambers or cells of the rotor. Heretofore, in such engines, upon the explosion of the combustible charges, the effect thereof was transmitted by the dynamic impact pressure of the liquid upon the rotor, there being free and open communication between the adjacent ends of the combustion chambers or cells. It is the primary object and purpose of my present invention to provide a rotary engine of relatively simple construction and wherein the driving impulse is imparted to the rotor by means of the static pressure effect of the individual liquid bodies in the combustion chambers or cells of the rotor.

It is a more particular object of the invention to provide simple and effective means for sealing and completely isolating each rotor cell or chamber from every other cell thereof, so that the individual liquid pistons in said chamber at all times remain substantially of equal and constant volume, whereby the same compression effect upon the combustible gas charge is obtained in each rotor cell and any failure or irregularity of ignition of the combustible gas is limited in effect to the chamber in which it occurs. Thus a high degree of efficiency will be obtained in the operation of the engine.

With the above and other objects in view, the invention consists in the improved rotary engine, and in the form construction and relative arrangement of its several parts as will be hereinafter more fully described, illustrated in the accompanying drawings, and subsequently incorporated in the subjoined claims.

The various embodiments of my invention will be described hereinafter with the aid of the accompanying drawings, and the invention set forth succinctly in the claims.

In the drawings,

Figure 1 is an elevation with one side of the rotor case or housing removed and illustrating one practical embodiment of the present invention;

Fig. 3 is a transverse vertical section through the rotor and the stationary case or housing therefor and illustrating more or less diagrammatically a somewhat different form of the means for sealing the cells or chambers of the rotor;

Fig. 3a is an enlarged view of one of the rotor arms and sealing members of the modification shown in Fig. 3.

Figs. 4, 5, 6 and 7 are detail fragmentary sectional views showing various other alternative forms of the movable sealing members for the rotor cells;

Fig. 8 is a fragmentary section on an enlarged scale illustrating a modified form of the sealing member as shown in Fig. 3 of the drawings;

Fig. 9 is a similar detail sectional view showing a sealing means for the rotor wheel cells which embodies a rotating friction reducing element;

Fig. 10 is a similar detail sectional view showing another alternative form of the sealing means;

Fig. 11 is a fragmentary elevation illustrating a slight variation of the movable sealing members as shown in Fig. 1 of the drawings;

Fig. 12 is a diametric sectional view illustrating another form of the rotor wheel and also a slightly different arrangement of the ignition means, and Fig. 13 is a vertical transverse sectional view showing a further alternative means for sealing the rotor wheel cells.

Figure 2:
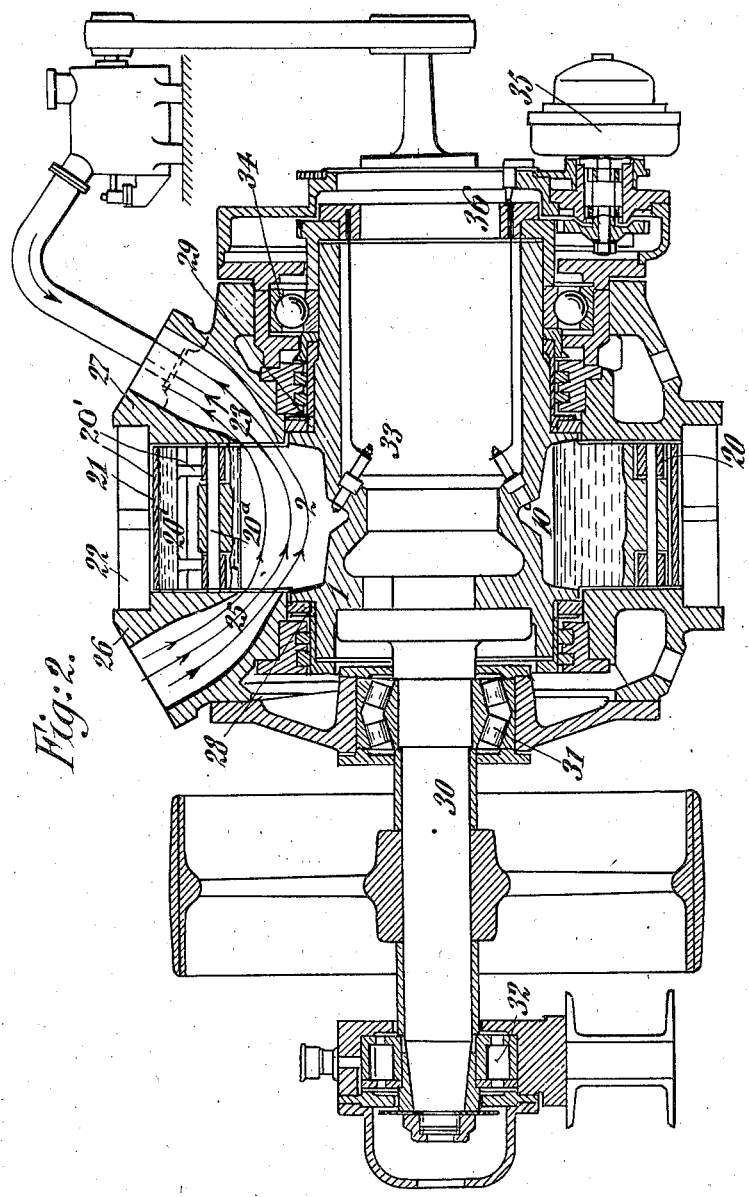
Fig. 2 is a longitudinal sectional view.

Referring in detail to the drawings, and for the present more particularly to Figs. 1 and 2 thereof, in this construction which illustrates an engine of comparatively small size, the rotor 1 may be integrally formed with one end of a power shaft 30 or may be suitably rigidly secured to one end of the shaft. The rotor has also a hollow hub portion, and said hub portion of the rotor and the shaft 30 are mounted or supported in suitable anti-friction bearings as indicated at 34, 31 and 32 in eccentric relation to the rotor case or housing generally indicated at 22 and which receives the spaced radially extending arms or blades 50 of the rotor. These arms or blades at opposite side edges thereof have a close running fit against the inner surfaces of opposite side walls of the stationary case or housing 22. The spaced arms of the rotor thus form, within the case in conjunction with the sealing means to be hereinafter described, a plurality of individual isolated cells or chambers. In the instance illustrated by Figs. 1 and 2 of the drawings, there are eighteen such cells, numbered from 2 to 19 consecutively in Fig. 1 of the drawings. These cells are adapted to receive water or any other suitable non-compressible liquid medium, 51.

In order to maintain the volume of water present in the individual cells absolutely equal and to prevent communication between adjacent cells of the rotor wheel, I may provide each of the rotor arms or blades 50 at its outer end with a relatively movable sealing member. In the form shown, in Figs. 1 and 2 of the drawings, this sealing member 20 consists of a curved metal plate, preferably of increased thickness along one of its longitudinal edges extending across the rotor wheel cell and is provided with spaced webs or arms 20' fulcrumed for free swinging or turning movement upon a suitable pin or axis 20ᵃ mounted in the end of the rotor arm. The arms 20' may be connected by rods or bars 20''. From the above description of the sealing members 20, it is apparent that the outer end of each cell opens into a circumferential space extending between the concave face of the curved plate of one of said sealing members and the convex face of the curved plate of an adjacent sealing member, so that the water in the cell may freely flow into and from this space. Preferably, in order to reduce frictional resistance, the outer weighted edges of these sealing members have bearing engagement against the inner face of a freely rotating ring 21 mounted in slightly spaced relation to the inner face of the annular wall of the case or housing 22 by means of a lubricant film, such as water. This outer end of each rotor arm has one of its side faces concave with which the convex surface of the curved plate of the sealing member 20 on an adjacent rotor arm closely cooperates. Therefore, it will be evident that these movable members 20 will effectually seal the outer ends of the rotor wheel cells and prevent any flow of water from one of said cells into an adjacent cell. It will further be seen from reference to Fig. 1, that owing to the eccentric mounting of the rotor within the casing, the sealing members 20 will progressively swing or move inwardly and outwardly with relation to the rotor arms or blades 50, as said members are moved in the rotation of the rotor on relatively opposite sides of its axis.

A suitable spark plug indicated at 33 is provided for each rotor wheel cell at the inner end thereof, said spark plugs receiving current through suitable connections with contacts carried by a part rotating with the rotor 1 which are engaged by the current supply member 36 electrically connected with a suitable interrupter or distributor indicated at 35 having a driving connection with one end of the hub extension of the rotor wheel.

Above the axis of the rotor wheel, one side wall of the case or housing 22 is provided with an exhaust port 25 for the burned gases, a relatively long outlet scavenging port 23 and a gas mixture supply port 24. The other side wall of the casing directly opposite the outlet port 23 is provided with a similar inlet port for scavenging air as shown in Fig. 2 of the drawings. The parts 26 and 27 in which these ports are provided may be formed integrally with the side walls of the rotor case. Since such engines operate at very high speeds, the gas mixture may be continuously supplied through port 24, but if desired, a suitable throttling valve may be used to regulate the supply of gas mixture in accordance with the load.

It will also be understood that suitable checking or packing means such as that indicated at 28 and 29 is provided between the periphery of the rotor at the inner ends of the rotor cells, and the walls of the stationary case or housing 22.

In the operation of the engine above described, assuming that the rotor 1 is rotating in the direction indicated by the arrow in Fig. 1 of the drawings, as each cell comes into registration with port 24, it receives a charge of gas, the water piston contained in the cells at the upper side of the rotor being thrown outwardly by centrifugal force so that the inner surfaces of these pistons will be positioned beyond the ports 23, 24 and 25. The members 20 at the upper side of the rotor being also at the outer limits of their movement, have their outer edges spaced apart at relatively great distance and the water pistons acting against the outer convex surfaces of these members produces a certain additional driving impulse to the rotor wheel. As the rotor continues its movement, the admitted charge of gas is compressed in the individual cells, owing to the eccentric mounting of the rotor so that as the outer ends of the rotor blades or arms 50 approach the ring 21 combined with the inward movement of the members 20, the area of the individual cells is progressively decreased or diminished, thus forcing the water piston inwardly whereby the gas mixture is compressed in the inner end of the cell. In other words, in view of the eccentric mounting of the rotor, as the outer ends of the cell walls approach the wall of the casing at the bottom thereof, the pivoted members 20 must move inwardly, thereby decreasing the available space between the curved blades or plates of the adjacent members 20, and forcing the water therefrom inwardly into the cell and towards the axis of the rotor. Thus, when the cell reaches the point 10 in Fig. 1 of the drawings, the gas is in a highly compressed state. At this point, a circuit is closed through the spark plug 33 in said cells so that ignition takes place. The energy of the exploded gases acting against the inner face of the water piston, is transmitted through the body of water and delivered in the form of static pressure directed against one of the rotor blades and against one side of the sealing members 20 mainly in the direction of rotation of the rotor. The same action takes place in quick succession in each of the rotor cells, the combined static pressure effects on the rotor blades and the movable sealing members being thus more or less directly impressed through the rotor upon the power shaft 30. The power may be taken off from this shaft and utilized for various purposes, by any suitable means, such for instance as the belt wheel shown in Fig. 2 of the drawings.

As the rotor wheel cells move upwardly and the water pistons move outwardly in the respective cells under the expansion of the gases therein and centrifugal force, they will successively register with the exhaust port 25 where the greater part of the burned gases are exhausted to the atmosphere. After moving past this exhaust port and upon registration of the cell with the opposing ports 23, air from a suitable blower is delivered into the cell through one of these ports, thereby thoroughly scavenging or driving out the residue of burned gases therein through the port in the opposite side wall of the rotor case or housing. After the cell has moved beyond these ports, it then again registers with the intake port 24 and receives a fresh charge of the gaseous mixture so that the above described cycle of operations is repeated.

In Fig. 3 of the drawings, instead of pivotally mounting the cell sealing members on the outer ends of the rotor arms, I may provide the radially movable sealing members 38 slidably arranged in the slots 40 of the rotor arms 53 whereby said members by centrifugal action, are maintained in sliding engagement at their outer ends with the inner face 60 of the rotor case or housing 70. Thus, as in the first described embodiment of the invention, the rotor cells 100 are segregated or isolated from each other so that any interchange of the water contained in adjacent cells is effectually prevented. If desired, of course, I may supplement the action of centrifugal force by arranging suitable springs in the inner ends of the slots 40 to exert a constant outward resilient pressure against the members 38. In this embodiment of the device, I have shown a smaller number of the rotor cells than in the construction first described, but it will be understood that the illustration is more or less diagrammatic, and the rotor may be provided with any desired number of the cell forming arms.

Static pressure acts on the rotor blades and the sealing members to rotate the rotor in the direction indicated by the arrow in Figure 1, because, as will be best seen in Figure 3, the surface on which the water acts is larger at the forward wall of the cell than at the rear wall of the same cell and since the static pressure of the water is the same throughout the whole body of the water within the cell there is a differential force acting in the direction of the rotation of the rotor which drives the same.

In addition to the above described means for sealing the rotor cells and obtaining the alternate progressive increase and decrease in the individual cell area in the rotation of the rotor, numerous other alternative forms of the sealing means might be employed. Thus, as shown in Fig. 4, the sealing members 130 may consist of vanes or blades suitably fixed at their inner edges to the outer ends of the rotor arms 54 and having sliding bearing contact at their outer edges against the inner face 60 of the rotor case or housing.

In Fig. 5, the sealing members are in the form of stiff or rigid metal plates 120 pivoted at their inner edges to the ends of the rotor arms, while in Fig. 6, these sealing plates 121 are pivotally mounted at their outer edges on the inner face of a ring 140 which is rotatably engaged with the inner face of the rotor case or housing. The inner edges of said blades have sliding contact upon one side face of the respective rotor arms 55. In Fig. 7 of the drawings, the flexible sealing vanes or blades 131 are fixed at their outlet edges to the ring 140 and have sliding contact at their inner edges with the rotor arms 56.

In Fig. 8 of the drawings, instead of slotting the rotor arms to receive the radially movable plates 38 as in Fig. 3, I show the sealing member 180 in the form of a channelled or U-shaped plate embracing the outer end portion of the rotor arm and having parallel sides slidably engaged at their inner faces against opposite side faces of the arm 57. The intermediate portion of this channel shaped sealing member preferably has a convex outer surface having a single point of sliding contact upon the circumferential surface of the housing wall.

In Fig. 9 of the drawings, the sealing member 38 is engaged at its outer edge against the inner face of the ring 110 which is freely rotatable relative to the inner face of a bearing ring 65 secured to the circumferential wall of the rotor case or housing, said ring being provided at a suitable point with a feed groove or channel 66 for a lubricating liquid such as water which is distributed in a thin film between the opposing surfaces of the bearing ring 65 and the movable ring 110. Thus, frictional losses in the operation of the engine will be reduced to a minimum.

Fig. 10 illustrates slight modification of the form of the sealing means shown in Fig. 8 of the drawings, in which a shoe 105 is mounted for rocking or oscillating motion on the intermediate convex surface of the radially movable member 90 which is slidably engaged with the rotor arm 10 as shown in Fig. 8 of the drawings. The outer convex surface of the shoe 105 has sliding contact upon the inner surface 60 of the case or housing wall, or a separate bearing ring suitably attached to said wall.

Fig. 11 shows substantially the same form of pivoted sealing member as in Fig. 1, though a somewhat simplified construction. These sealing members 230 having arms 20', are pivotally mounted upon the outer ends of the rotor arms 58 and each has a concavo-convex plate cooperating with the end of an adjacent rotor arm and bridging the space between said arm and the circumferential face of the housing wall, or a separate ring mounted therein and rotating with the rotor so as to effect the sealed communication between the rotor cells.

In Fig. 12, I have illustrated more or less conventionally a somewhat different type of the device, in which the power shaft 199 extends axially through the rotor and is journalled in bearings at opposite sides thereof. The rotor 200 is keyed or otherwise rigidly fixed to the shaft. The case or housing consists of the opposite side plates 210, 220 between which the radially extending arms of the rotor 200 having a close running fit, said side plates being rigidly connected by the outer annular wall of the rotor housing with the inner face 60 of which, the movable sealing members 20 for the rotor cells cooperate in the manner above explained. In this case, I have shown the means for supplying current to the spark plugs of the respective rotor cells as consisting of a fixed arm 360 which is connected to one terminal of a battery, while the other terminal of such battery is electrically connected in any conventional way with the metal shells of the spark plugs. The free end of the arm 360 is positioned so that in the rotation of the rotor 200, the ends of the central electrodes of the spark plugs will pass in closely adjacent relation thereto so that current will be supplied through the electrode and in jumping the gap between the spaced points of the spark plug will form an arc in the rotor cell whereby the compressed mixture is ignited. However, it will be understood that this igniting means constitutes no essential feature of the invention and numerous other methods might be employed for igniting the compressed gas.

In Fig. 13 of the drawings, I disclose a somewhat different sealing means for the rotor cells, in which there is loosely mounted within the rotor case or housing 180, the ring or annulus 170 having a circumferential succession of internal convex parts 175. The number of these convex projections on the ring 170 exceeds the number of arms 160 on the rotor 150 by one. Thus, as the rotor 150 is rotated, due to the eccentric mounting of said rotor with respect to the casing 180 and ring 170, the outer ends of the arms 160 are correspondingly moved inwardly and outwardly at opposite sides of the rotor axis and maintained in contact with the convex surfaces 175 of the ring 170 while also causing the travel of the ring 170 equal to one rotation of the ring 170 less the length of one of the convex surfaces 175, for each complete rotation of the rotor 150. Hence, for thirteen revolutions of the inner rotor 150, twelve revolutions of the outer ring 170 result. Therefore, in this case, it will be seen that I avoid the necessity of providing the several radial arms of the rotor with individual sealing means movable relative thereto.

Having described the various embodiments, it will have been seen that the energy of the exploded gas is transmitted through the fluid medium in the form of static pressure to the shaft. Also, that the fluid piston stroke and thereby the degree of sealing is the same for partial load as for full load, wherein always satisfactory gas compression and combustion takes place. Each cell or cell chamber is independent; possible disturbances in that cell chamber remain in the cell chamber in which they were created and do not affect the adjacent cell chamber or the actions therein. For each revolution, in the embodiments shown, the auxiliary fluid in the cell chambers moves once radially inwardly and outwardly, this being due to the eccentricity of the cell wheel to the casing. If two strokes are desired, an elliptical guide can be arranged. Any difference in pressure in two adjacent cell chambers which might ordinarily cause the fluid to pass from one cell to another is entirely prevented by the sealing means, which may be of different forms and constructions, as long as a sealing means is provided which is compensatory to the progressively changing dimensions and maintains the cell chambers independent of each other and separate from each other in their interior working actions. While some of the sealing means shown may not be new per se, their arrangement in cooperative position to the explosion or combustion of gases acting upon an auxiliary fluid presents a novel cooperative law and a novel combination. It will be here noted that the walls and the sealing means are partly rigid and partly movable.

I claim:

1. In a rotary engine, a housing, a rotor eccentrically mounted therein and having radially disposed cells, means producing a progressive increase in the area of the cells in the direction of rotation on one side of the rotor axis and a corresponding progressive decrease in cell area on the opposite side of said axis, said means cooperating with a part on the housing to seal communication between adjacent cells, an auxiliary fluid medium interposed between the housing and rotor forming a liquid piston sealed in each cell by said means, said liquid covering said sealing means, means for exhausting burned gas from each cell and admitting a fresh charge thereto during the period when the cells are of relatively great area whereby the gas charge is progressively compressed by the liquid piston as the cell area is diminished, and means for igniting the compressed gas.

2. A rotary engine as described in claim 1, in which the cells are partly formed by spaced radial arms rigid with the rotor and partly by a sealing means interposed between the rotor arms and the circumferential wall of the housing and movable relative to said housing wall and the rotor arms.

3. In a rotary engine, a casing, a rotor eccentrically mounted in said casing and having a plurality of radially arranged cells, a sealing means for each cell on the outer end thereof, an equal quantity of liquid in each cell entirely covering said sealing means, means for supplying a gas charge to each cell for compression by the liquid piston therein, means for igniting the compressed gas, and means for exhausting the burned gases from the rotor cells.

4. In a rotary engine, a casing, a rotor eccentrically mounted in said casing and having a plurality of radial cells open at their outer ends, movable sealing means to seal communication between the open ends of adjacent cells in the rotation of the rotor for isolating the cells, a liquid in each cell having a depth sufficient to prevent contact of gases with said sealing means, said casing having gas intake and exhaust ports for the rotor cells, and means for igniting the gas charges supplied to said cells.

5. A rotary engine as described in claim 4 in which said means for isolating the cells includes an annular member rotatably mounted in the casing for movement relative to the rotor and in constant cooperative engagement with parts of the rotor cell walls to maintain an effective seal of the outer ends of the individual cells in the rotation of the rotor.

6. A rotary engine as described in claim 4, in which the means for isolating said cells includes a rigid annular member rotatably mounted in the casing for movement relative to the rotor, and having a continuous succession of internal projections cooperating with the outer ends of the cell walls to maintain an effective seal of the outer ends of the individual cells in the rotation of the rotor.

7. A rotary engine as described in claim 4, in which said means for isolating the cells includes radially sliding members on the circumferentially spaced cell walls slidably cooperating at their outer ends with a part on the rotor casing.

8. A rotary engine as described in claim 4, in which the means for isolating the cells includes a member pivoted at one of its ends to one of the circumferentially spaced walls of each cell, and having an arcuately curved part at its other end slidably cooperating with the opposite wall of the cell and with a part on the rotor casing.

9. In a rotary engine including a casing, a rotor eccentrically mounted in said casing and having a plurality of radial cells open at their outer ends, said casing having gas intake and exhaust ports for the rotor cells, and means for igniting the gas charges supplied to said cells; mechanical means operating to continuously seal communication between the outer open ends of adjacent cells, an equal quantity of liquid in each cell covering said mechanical means, said means comprising sealing members movably supported upon one radial wall of the respective cells and each having a part in slidable contact with the opposite wall of said cell and bridging the space between said cell wall and the rotor casing to receive the pressure impulse in an adjacent cell.

10. In a rotary engine including a casing, a rotor eccentrically mounted in said casing and having a plurality of radial cells open at their outer ends, said casing having gas intake and exhaust ports for the rotor cells, and means for igniting the gas charges supplied to said cells; mechanical means operating to continuously seal communication between the outer open ends of adjacent cells, an equal quantity of liquid in each cell covering said means, said means comprising members pivotally mounted upon the outer end of one radial wall of the respective rotor cells, and each having a part bridging the space between the rotor casing and the opposite cell wall and slidably cooperating with the latter to receive the pressure impulse in an adjacent cell.

11. A rotary engine comprising a casing having intake and exhaust ports, a rotor eccentrically mounted in the casing, blades carried by the rotor and forming with the casing and the rotor non-communicating chambers, sealing means for each blade contacting with the casing, and an equal quantity of liquid in each chamber covering said sealing means and said quantity of liquid acting to compress or permit expansion of gases within each chamber, depending upon the position of the chamber in respect to its rotation.

12. A rotary engine comprising a casing having intake and exhaust ports, a rotor eccentrically mounted in the casing, said rotor including a plurality of radially arranged blades provided with sealing means for sealing the blades throughout the rotation thereof in the casing, and a substantial quantity of liquid disposed between pairs of blades entirely covering said sealing means, the liquid between one pair of blades being independent from the liquid between adjacent blades throughout the rotation of the blades.

13. A rotary engine comprising a casing having intake and exhaust ports, a rotor eccentrically mounted in the casing, said rotor including a plurality of fixed radially arranged blades, movable sealing means carried by each blade for sealing each blade during the complete rotation thereof in the casing, and an equal quantity of liquid between pairs of blades throughout the rotation thereof, said liquid preventing contact of gases with said sealing means.

14. A rotary engine comprising a casing having intake and exhaust ports, a rotor eccentrically mounted in the casing, said rotor including a plurality of radially arranged blades, movable sealing means carried by each blade for sealing each blade during the complete rotation thereof in the casing, and a quantity of liquid between each pair of blades, the quantity of liquid between each pair of blades being sufficient to compress gases during one cycle of the rotor and prevent contact of gases with said sealing means.

15. A rotary engine driven by or delivering gases, comprising a casing having intake and exhaust ports, a rotor eccentrically situated in respect to the casing, a plurality of blades rigidly mounted upon said rotor radially arranged, provided with sealing means for sealing the blades against the casing wall throughout the rotation thereof in the casing, and forming cells isolated from each other, and a substantial quantity of liquid disposed between each pair of blades equal in quantity between each pair of blades, the liquid between one pair of blades being independent from the liquid between adjacent blades throughout the rotation of the blades, and said quantity of liquid acting to compress or permit expansion of gases within the cell, depending upon the position of the cell in respect to its rotation and prevent contact of the gases with the sealing means.

ERNST SEIBOLD.